UNITED STATES PATENT OFFICE.

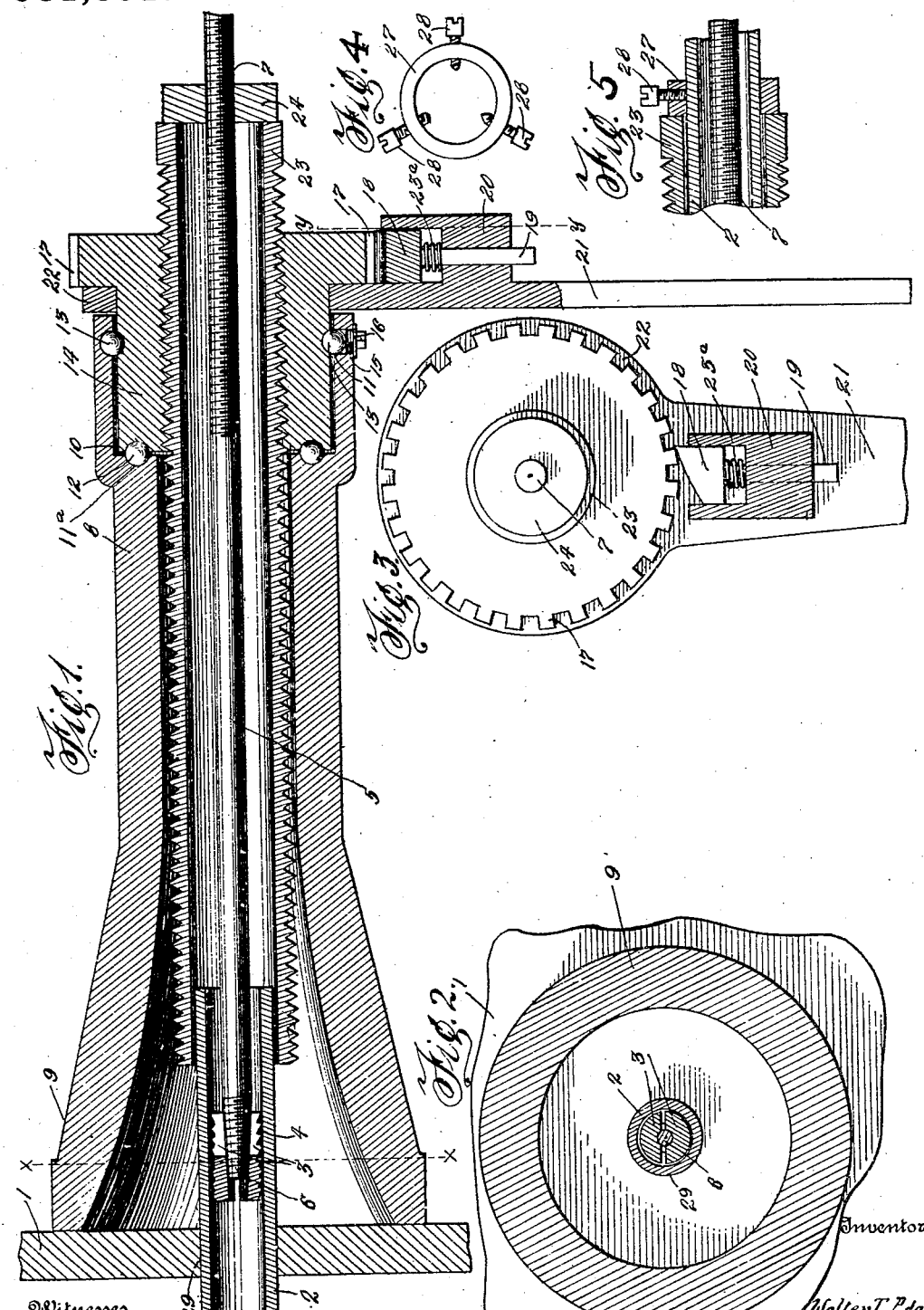

WALTER T. ADAMS, OF HAYESBORO, AND RICHARD HIGGINS, OF PITTSBURG, PENNSYLVANIA.

TUBE-DRAWING DEVICE.

No. 931,551.　　　　Specification of Letters Patent.　　　Patented Aug. 17, 1909.

Application filed January 14, 1909. Serial No. 472,228.

*To all whom it may concern:*

Be it known that we, WALTER T. ADAMS and RICHARD HIGGINS, citizens of the United States of America, residing at Hayesboro, and Pittsburg, in the county of Allegheny and State of Pennsylvania, have invented certain new and useful Improvements in Tube-Drawing Devices, of which the following is a specification, reference being had therein to the accompanying drawing.

This invention relates to a tube drawing device, and more particularly to a device for drawing tubes from a boiler or similar structure, where it is often necessary to remove a bursted or leakable tube from the boiler, without interfering with or moving the remaining tubes.

The objects of our invention are first, to provide a simple and durable device that can be easily manipulated to place the end of a tube in position to be readily gripped and removed from the boilers; and second, to provide novel means in connection with the device for gripping the interior of a pipe or tube to permit of the same being quickly removed.

We attain the above objects by a device that will be hereinafter described in detail and then specifically pointed out in the appended claims.

Referring to the drawings:—Figure 1 is a longitudinal sectional view of a portion of our device, Fig. 2 is a cross sectional view taken on the line $x$—$x$ of Fig. 1, Fig. 3 is a cross sectional view of our device taken on the line $y$—$y$ of Fig. 1, Fig. 4 is an elevation of a detachable clamping ring, and Fig. 5 is a sectional view of the same in position upon the tube.

In the accompanying drawings, 1 designates the head or crown plate of a boiler, in which the ends of the various tubes of the boiler are secured, the outer ends of the tubes being flush with the outer face of the plate 1.

To illustrate the manner in which our device is used for removing the tubes from a boiler, we have shown one of the tubes 2 as partially withdrawn. To obtain a hold upon the tube 2 we employ a clutch comprising two semi-cylindrical members 3 having peripheral teeth 4 for engaging the inner face of the tube 2. The members 3 are placed in the tube 2 and then expanded by a rod 5 having a tapering threaded end 6 adapted to screw between said members and force the members into engagement with the tube 2. The outer end of the rod 5 is threaded, as at 7, and the manner in which this rod is moved will be presently described.

Adapted to engage the outer face of the plate 1 is a cylindrical casing 8 having a flared bearing end 9 for engaging the plate 1. The outer end of the casing is provided with an annular recess 10 having the sides and end wall thereof provided with annular ball races 11, 11$^a$ respectively. Arranged within the recess 10 is a block 14 having ball races registering with the races 11, 11$^a$, and in these races are anti-friction balls 12 and 13. The anti-friction balls 12 are easily placed in position and in order to place the balls 13 in position after the block 14 has been placed in the recess 10, the casing 8 near the outer end thereof is provided with an opening 15 communicating with the ball race 11, said opening being normally closed by a plug 16. The block 14 protrudes from the recess 10 and is provided with circumferentially arranged teeth 17. Adapted to engage said teeth is a pawl 18 having a shank 19 loosely mounted in a housing 20, carried by a lever 21, having a circular head 22, to receive the block 14, said head 22 being placed upon the block prior to placing the latter in the recess 10 of the casing 8. In the housing 20 and encircling the shank 19 is a coil spring 23$^a$ for normally holding the pawl 18 in engagement with the teeth 17. Threaded in the block 14 is a longitudinal tubular screw 23 and adapted to engage the outer end of said screw is a nut 24 detachably mounted upon the threaded end 7 of the rod 5.

27, (Figs. 4 and 5) indicates a clamping ring which we employ in connection with the device as will more fully appear in the operation, and 28 indicates set screws by means of which said ring is secured upon the tube 2 when the latter has been partially withdrawn.

Operation: The clutch, comprising the members 3, is first placed within the tube 2 and then the rod 5 screwed into the clutch to clamp the same within the tube.

To draw the tube 2 through the opening 29, the casing 8 is placed in the position shown in Fig. 1 and the nut 24 threaded upon the rod 5 to engage the end of the tubular screw 23. The ratchet lever or handle 21 is now oscillated to rotate the block 14 and move the screw 23 outwardly, carrying with it the rod 5 and the tube that has been previously attached to the inner end of said rod. After the end of the tube 2 has been withdrawn a sufficient distance from the plate 1, the entire device can be removed, and the clamping ring 27 secured to the end of the tube to permit of other mechanism being attached to the tube 2 for pulling the same, or after the tube 2 has been withdrawn a sufficient distance from the boiler head, the screw can be returned to its normal position, the clamping ring placed upon the tube at the outer end of the screw and then the device operated to again move a portion of the tube 2 from the boiler. This operation, which is preferable, can be continued until the whole tube has been withdrawn from the boiler.

It is apparent from the foregoing description that we employ a ratchet mechanism in connection with our device for expeditiously removing a tube from a boiler, without much labor on the part of the operator of the device.

While in the drawings forming a part of this application there is illustrated a preferred embodiment of our invention, we would have it understood that the detail construction thereof can be varied or changed as to shape, proportion and manner of assemblage without departing from the spirit of the invention.

Having now described our invention what we claim as new, is:—

1. In a tube drawing device, a casing having a flared inner end adapted to engage a plate from which a tube is to be drawn, a block mounted to be revolved in the outer end of the casing and extending beyond said outer end and provided exteriorly of the casing with ratchet teeth, a hollow screw extending through the block and into the casing, a rod extending through said screw having a threaded portion, a clutch on the inner end of said rod and adapted to be expanded thereby into engagement with the inner face of the tube, a nut on the threaded portion of the rod engaging the outer end of the hollow screw, and means for engagement with the ratchet teeth of said block to rotate the block and withdraw the screw and rod within the casing.

2. In a tube-drawing device, a case provided at the outer end thereof with a recess, a block revolubly mounted in said recess and provided at its outer end with ratchet teeth, a hollow screw extending through said block and into said casing, a rod extending through said screw and provided with a tapering threaded inner end, a tube-engaging clutch on said inner end of the rod adapted to be expanded by said rod into engagement with the inner face of a tube, a nut on the rod engaging the outer end of the screw, and a lever rotatably mounted on said block and having a pawl for engagement with said ratchet teeth to rotate the block and withdraw the screw and rod within the casing.

In testimony whereof we affix our signatures in the presence of two witnesses.

WALTER T. ADAMS.
RICHARD HIGGINS.

Witnesses:
K. H. BUTLER,
A. J. TRIGG.